Oct. 9, 1923.
W. D. COLLINS ET AL
ELECTRIC SWITCH
Filed May 6, 1920
1,470,059
2 Sheets-Sheet 1
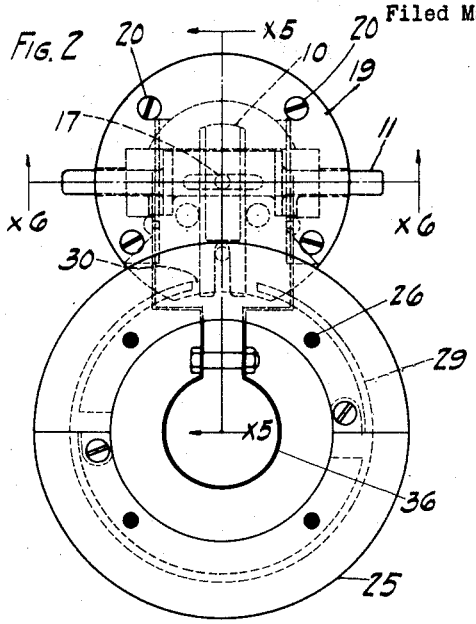
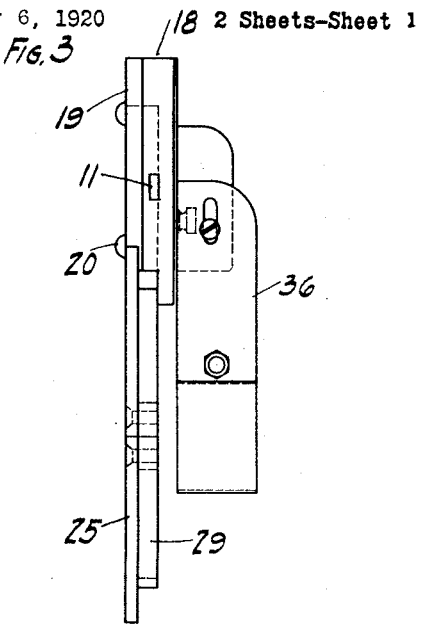
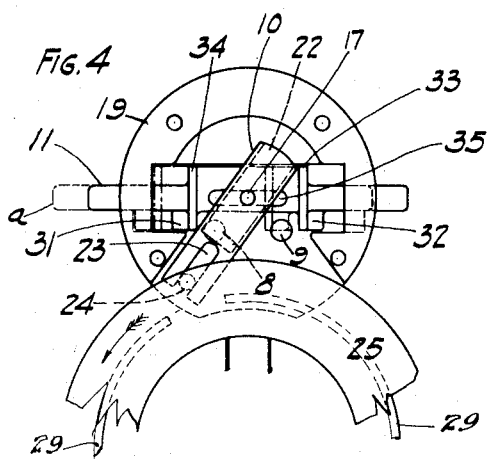
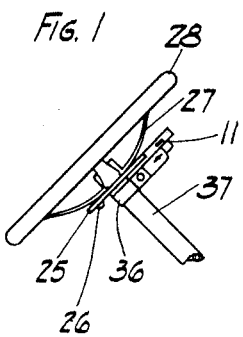
INVENTOR.
WILLIAM D. COLLINS.
GEORGE W. H. ALLEN.
BY
ATTORNEY Oct. 9, 1923.
W. D. COLLINS ET AL
1,470,059
ELECTRIC SWITCH
Filed May 6, 1920
2 Sheets-Sheet 2
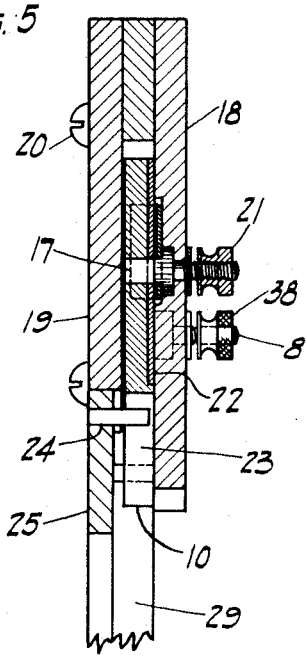
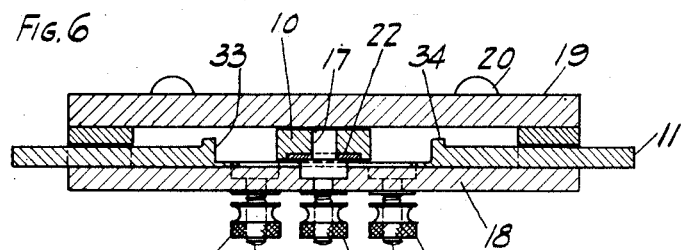
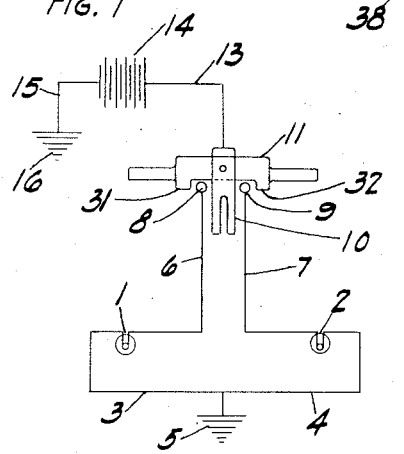
INVENTOR.
WILLIAM D. COLLINS.
GEORGE W. H. ALLEN.
BY
ATTORNEY.

Patented Oct. 9, 1923.

1,470,059

UNITED STATES PATENT OFFICE.

WILLIAM D. COLLINS, OF PASADENA, CALIFORNIA, AND GEORGE W. H. ALLEN, OF CAZENOVIA, NEW YORK.

ELECTRIC SWITCH.

Application filed May 6, 1920. Serial No. 379,230.

*To all whom it may concern:*

Be it known that we, WILLIAM D. COLLINS, residing at Pasadena, in the county of Los Angeles and State of California, and GEORGE W. H. ALLEN, residing at Cazenovia, in the county of Madison and State of New York, both citizens of the United States, have invented a new and useful Electric Switch, of which the following is a specification.

This invention relates to switches of the type combining manual and automatic control, and it is especially useful in connection with electrically operated direction indicators for vehicles to govern the operation of said indicators.

This switch is more especially constructed for connection with the steering gear of an automobile for automatic operation produced by operation of the steering gear. This invention is an improvement on the switch disclosed in our copending application for patent filed March 29, 1919, Serial No. 286,089. The prior invention pertains to a switch capable of governing an electric circuit by operation of the steering gear of a vehicle and, also, to one which can be manually operated to open and close the circuit, and, furthermore, to one in which the manual switch can be normalized by operation of the steering gear to turn the vehicle in the direction indicated by prior operation of the manual switch.

This invention differentiates from said former invention in that, not only is the manual switch normalized by operation of the steering gear in a direction to turn the vehicle in the direction indicated, but the manual switch is also normalized by turning of the steering gear to cause steering of the vehicle in a direction opposite to that indicated by previous operation of the manual switch.

From the foregoing it is clear that one of the objects of this invention, in contradistinction to those of the former invention, is to automatically effect a change in the indication of the signaling from one direction to another, if the driver of the vehicle should decide, after operating the manual switch, to turn in a direction opposite to that indicated by such operation of the manual switch.

Other objects and advantages will appear in the subjoined detailed description.

The accompanying drawings illustrate the invention.

Figure 1 is a side elevation of a construction embodying the invention, a fragment of the steering gear of a vehicle being shown in operative relation to the switch.

Fig. 2 is a plan view of the switch shown in Fig. 1, the parts being in circuit-breaking position.

Fig. 3 is an edge view of Fig. 2 from the right thereof.

Fig. 4 is a broken plan view similar to Fig. 2, excepting that the switch box cover is omitted and the switch arm and its operating member are shown in the positions they occupy when the steering gear has been operated to make a left turn. The manually-operated switch bar is indicated in broken lines in the position it occupies when operated to indicate a turn of the vehicle to the right.

Fig. 5 is an enlarged sectional elevation on line indicated by $x^5$—$x^5$, Fig. 2, omitting the bracket.

Fig. 6 is an enlarged sectional elevation on line indicated by $x^6$—$x^6$, Fig. 2, omitting the bracket.

Fig. 7 is a diagram of electrical connections.

Referring first more particularly to Fig. 7 of the drawings, the direction signals are indicated at 1, 2. It may be assumed, for purposes of description, that the indicator 1 is on the left for indicating a left turn, and that the indicator 2 is on the right for indicating a right turn. The direction indicators 1, 2 are shown in the form of incandescent lamps, but it is to be understood that any suitable electrically operated direction indicators or indicator may be used in connection with the switch hereinafter described. It is our intention to use this invention with the direction indicator disclosed in our copending application for patent.

The indicators 1, 2 are connected, respectively, by conductors 3, 4 to a ground 5 and are also respectively connected by conductors 6, 7 to contacts 8, 9. In this diagram of connections is indicated a switch arm or lever 10 adapted to engage either of the contacts 8, 9, and there is also shown a push rod 11, adapted to engage either of said contacts. The arm 10 is connected by a conductor 13 to one side of a source 14 of electric current, said source, in this instance, being indicated as an electric battery. The other side of the electric source 14 is connected by a conductor 15 to a ground 16. It will be clear from the foregoing that movement of the push rod 11 to the left will energize the right hand direction indicator 2, and that movement of said push rod to the right will energize the left hand direction indicator. It will also be clear that counter-clockwise rotation of the arm 10 will cause the electric current to effect energization of the direction indicator 2, and that clockwise rotation of the arm 10 will cause the electric current to effect energization of the direction indicator 1. The push rod 11 and contacts 8, 9 constitute a manually operative switch, and the arm 10 is adapted to be operated by operation of the steering gear thus, in effect, producing automatic operation of the arm 10. Thus the arm 10 and the contact 8, 9 constitute an automatic switch. In this particular instance, the contacts 8, 9 serve for both switches, but it is readily seen that separate contacts could be employed, if so desired.

For more detailed construction of the switch, the construction disclosed in Figs. 1 to 6 will now be described. The switch arm 10 is pivoted at 17 to the base 18 of a switch box, the cover of said box being indicated at 19 and being fastened by screws 20 to the base. The pivot 17, in this instance, also forms a binding post provided with a nut 21 whereby the conductor 13 may be secured to the switch. The arm 10 may be made of any suitable material and, in this instance, is formed in part by an electrical insulation member and in part by an electrical conducting member indicated at 22. The conducting member 22 is in electrical contact with the pivot 17.

The arm 10 is provided at one end with a slot 23 adapted to be engaged by a pin 24 projecting from the under face of an operating member 25 in the form of a ring which is fastened by screws 26 to the spokes 27 of the steering wheel 28 shown in Fig. 1. Turning of the steering wheel turns the ring 25 and thus operates the arm 10 to cause engagement of said arm with either of the contacts 8, 9, the conducting member 22 of said arm forming a contact and being of sufficient length to extend over the contact 8 or 9 when the arm is swung to one side or the other, as clearly shown in Fig. 4. The contacts 8, 9 in this instance, are in the form of binding posts which are provided with nuts 38, the binding posts and nuts serving to connect the conductors 6, 7 to the switch.

The ring 25 is provided on its under face with a projecting flange 29 having an opening 30 through which the slotted end of the arm 10 extends when the arm is in circuit-breaking positions, as in Fig. 2. If the steering wheel 28 be turned sufficiently to cause the pin 24 to leave the slot 23, the flange 29 will turn sufficiently to protect the slotted end of the arm 10 against being tempered with to change its position. After the ring 25 has been moved to such position as to withdraw the pin 24 from the slot 23, if it were not for the flange 29, a child could insert its fingers between the ring and the switch box base 18 and throw the arm 10 into neutral position. The slot and pin connection provides for considerable lost motion between the arm and the ring so that the steering wheel, when turned slightly, will properly operate the arm 10 and so that the comparatively limited movement of the arm 10 will not interfere with a much greater movement of the ring 25, the greater movement being necessary in making a turn of relatively great magnitude.

The push rod 11, in this instance, is entirely of metal capable of conducting electricity and forms at opposite sides of the pivot 17 electrical contacts 31, 32 adapted to engage the contacts 8, 9 by movement of the rod 11 to the left and right, respectively. The push rod 11 is provided with upwardly projecting shoulders 33, 34 on opposite sides of the pivot 17, said pivot passing through a slot 35 in the push rod so as to permit endwise movement of said push rod. The arm 10, in reality, constitutes a lever adapted, when the arm is in neutral or mid position and the push rod is in circuit closing position and the arm is swung on its pivot, to engage the shoulders 33 and 34, as the case may be, to normalize or retract the push rod to neutral or mid position. The shoulders 33, 34, extend on opposite sides of a plane passing lengthwise of the push rod through the pivot 17. Thus it makes no difference, whether the arm 10 is turned clockwise or counter-clockwise, the edge of said arm will strike the shoulder nearest it and retract the push rod. In the hereinbefore mentioned invention, the operating arm, corresponding with the arm 10, will cause retraction of the push rod, corresponding with the push rod 11, by operation of the arm in one direction only, when the push rod engages either of the contacts 8, 9.

The switch box 18, 19 is connected by a suitable bracket 36 to the steering post or column 37 of the steering gear of the vehicle, as clearly shown in Fig. 1. This bracket 36 may be constructed in any desired manner and, in this instance, clamps around the steering post just beneath the steering wheel 28.

In practice the invention operates as follows: Assuming that the driver of the vehicle, with which the invention is associated, desires to turn to the right, he will preferably indicate that it is his intention to so turn by pressing with his right hand upon the projecting right end of the push rod 11, thus causing said rod to assume the position shown in dotted lines *a* in Fig. 4. In this position to the left the contacts 9, 32 engage, thus establishing the electric circuit through the right hand indicator 2. Now, if it be assumed that the driver turns the steering wheel clockwise to steer the vehicle to the right, it is clear that such turning will turn the arm or lever 10 counterclockwise to cause said lever to engage the shoulder 33 and thus retract the push rod 11 to circuit-breaking position and, coincidently, to move the arm 10 into engagement with the contact 9 so as to prevent actual breaking of the circuit through the direction indicator 2. Or, assuming that after thus preindicating a turn to the right as above described, the driver actually turns to the left instead of to the right, the arm 10 will then be turned clockwise to the position shown in Fig. 4 by turning of the steering wheel to the left. Moving the arm thus causes said arm to engage the shoulder 33, at a different point on said shoulder, to retract the push rod to its mid position. This movement of the arm 10 also causes it to engage the contact 8, thus establishing the electric circuit through the left hand direction indicator 1. The retraction of the push rod breaks the circuit through the right hand direction indicator 2. Thus, though the driver of the vehicle has turned to the left instead of to the right, the direction signals will be changed so that the direction of turning will be properly indicated at the beginning of such turning movement.

After the turn to the right or left is effected in the manner above described, the driver will resume a straight course by turning the steering wheel to the left or right, as the case may be, thus restoring the arm 10 to mid position and cutting out which ever direction indicator has been energized.

If the driver desires to indicate a left turn, before making such turn, he will proceed as above described for making a turn to the right, excepting that he will press with his left hand upon the projecting left hand of the push rod 11 so as to move said push rod endwise to the right to cause the contact 31 to engage the contact 8, thus energizing the direction indicator 1.

The construction and arrangement of the switch parts may be modified if desired and the circuit connections may be varied without departing from the spirit of the invention. Accordingly, we do not desire to limit ourselves to the particular construction and arrangement of parts herein described, but aim in the appended claims to cover all modifications which fall within the spirit and scope of our invention.

We claim:

1. The combination with the steering gear of a vehicle, of means including a forked member operatable to different positions to close different electric circuits, a finger connected with the steering gear and engaging the fork when the steering gear is in the straight ahead position, said finger disengaging the fork when the steering gear is operated a predetermined extent to effect turning of the vehicle to one side or the other, manually operable means to close either of said circuits in advance of the operation of the steering gear and operatable to circuit-opening position by movement of the forked member to either circuit-opening position.

2. The combination with the steering gear of a vehicle, of means including a forked member operatable to different positions to close different electric circuits, a finger connected with the steering gear and engaging the fork when the steering gear is in the straight ahead position, said finger disengaging the fork when the steering gear is operated a predetermined extent to effect turning of the vehicle to one side or the other, and manually operated means operable in advance of the operation of the steering wheel for closing either of said circuits in advance of the operation of the steering gear, said forked member when in circuit-closing position precluding the operation of the manually operated means.

Signed at Los Angeles, California, this 29th day of April, 1920.

WILLIAM D. COLLINS.
GEORGE W. H. ALLEN.

Witnesses:
GEORGE H. HILES,
L. BELLE WEAVER